United States Patent
Yamazaki et al.

(10) Patent No.: US 6,748,762 B2
(45) Date of Patent: *Jun. 15, 2004

(54) ABSORPTION-REFRIGERATOR

(75) Inventors: Shiguma Yamazaki, Tochigi-ken (JP);
Eiichi Enomoto, Tochigi-ken (JP);
Masahiro Fukukawa, Tochigi-ken (JP)

(73) Assignees: Sanyo Electric Co., Ltd., Osaka-fu (JP); Sanyo Electric Air Conditioning Co., Ltd., Tochigi-ken (JP)

(*) Notice: Subject to any disclaimer, the term of this patent is extended or adjusted under 35 U.S.C. 154(b) by 0 days.

This patent is subject to a terminal disclaimer.

(21) Appl. No.: 10/279,763

(22) Filed: Oct. 24, 2002

(65) Prior Publication Data
US 2003/0079494 A1 May 1, 2003

(30) Foreign Application Priority Data
Oct. 25, 2001 (JP) .................................... 2001-328273

(51) Int. Cl.[7] .............................................. F25B 15/00
(52) U.S. Cl. ................................ 62/476; 62/489; 62/85
(58) Field of Search .......................... 62/476, 487, 475, 62/238, 85

(56) References Cited
U.S. PATENT DOCUMENTS 6,003,331 A * 12/1999 Kohler et al. ............... 62/476
6,487,874 B2 * 12/2002 Yamazaki et al. ........... 62/476

FOREIGN PATENT DOCUMENTS

| JP | 6-63672 | 8/1994 | |
| JP | 2001174100 A | * 6/2001 | ........... F25B/33/00 |

* cited by examiner

Primary Examiner—Chen-Wen Jiang
(74) Attorney, Agent, or Firm—Weingarten, Schurgin, Gagnebin & Lebovici LLP

(57) ABSTRACT

An absorption-refrigerator provided with a mechanism for recuperating heat from the exhaust gas, wherein water vapor contained in the exhaust gas is prevented from condensing even during the starting or partial load operation. An absorption-refrigerator, wherein a first and a second heat recovery systems 23, 24 are installed, an absorption liquid bypass pipe 11B for the diluted absorption liquid exited from the cold heat exchanger 9 flows by bypassing a second+heat recovery system 24, a flow control valve 25 is provided in this absorption liquid bypass pipe 11B, and a controller 27 for controlling the open of a flow control valve 25 is provided so that a predetermined temperature (for instance 100° C.) superior to the dew-point temperature of the exhaust gas is detected continuously by a temperature sensor 26.

2 Claims, 8 Drawing Sheets

ABSORPTION-REFRIGERATOR

BACKGROUND OF THE INVENTION

1. Field of the Invention

The present invention concerns an absorption-refrigerator.

2. Detailed Description of the Prior Art

As shown in FIG. 8, an absorption-refrigerator devised to cut the fuel consumption by sending an exhaust gas discharged from a gas burner 2 for heating and boiling a diluted absorption liquid of a hot regenerator 1 to a heat recovery system 24X interposed between a cold heat exchanger 9 and a hot heat exchanger 10, increasing the temperature of the diluted absorption liquid being delivered from an absorber 7 to the hot regenerator 1 and reducing the heat quantity required by the gas burner 2 is proposed for example in the Japan Patent Publication No. 1994-63672.

In the aforementioned absorption-refrigerator of the prior art, a dense absorption liquid delivered from the cold regenerator and a diluted absorption liquid whose temperature has elevated at most to the order of 70° C. by heat exchange in the cold heat exchanger exchange heat, the exhaust gas temperature falls to the order of 80° C., and water vapor contained in the exhaust gas condenses and accumulates, eroding sometimes the heat exchanger and the exhaust pipe; therefore, it was necessary to use expensive materials excellent in corrosion resistance for these components.

SUMMARY OF THE INVENTION

In order to solve the aforementioned problems of the prior art, a first absorption-refrigerator comprising a hot regenerator for evaporating and separating a coolant by heating and boiling by a combustion apparatus and obtaining a coolant vapor and an intermediate absorption liquid from a diluted absorption liquid, a cold regenerator for heating the intermediate absorption liquid generated and supplied by this hot regenerator with the coolant vapor generated by the hot regenerator for evaporating and separating the coolant furthermore, and obtaining a coolant vapor and a dense absorption liquid from intermediate absorption liquid, a condenser for being supplied with a coolant liquid condensed by heating the intermediate absorption liquid in this cold regenerator and, at the same time, obtaining a coolant liquid by cooling the coolant vapor generated and supplied by this cold regenerator, an evaporator for evaporating the coolant by cooling a fluid flowing in a heat exchange tube on which the coolant liquid supplied from this condenser is spread, an absorber for absorbing the coolant vapor generated and supplied by this evaporator with the dense absorption liquid supplied by separating the coolant vapor from the cold regenerator for making a diluted absorption liquid and supplying the hot regenerator with same, a cold heat exchanger where the diluted absorption liquid and the dense absorption liquid flowing in and out this absorber exchange heat, and a hot heat exchanger where the intermediate absorption liquid and the diluted absorption liquid flowing in and out this hot regenerator exchange heat, wherein:

a first heat recovery system where an exhaust gas discharged from the combustion apparatus and the diluted absorption liquid having passed through the hot heat exchanger exchange heat, a second heat recovery system where the exhaust gas having passed through this first heat recovery system and the diluted absorption liquid, having passed through the low heat exchanger, before entering the hot heat exchanger exchange heat, an exhaust pipe or absorption liquid pipe bypassing this second heat recovery system, a valve provided in the exhaust pipe or absorption liquid pipe bypassing the second heat recovery system, and a control means for controlling the opening/closing of this valve based on the exhaust gas temperature, and a second absorption-refrigerator comprising a hot regenerator for evaporating and separating a coolant by heating and boiling by a combustion apparatus and obtaining a coolant vapor and an intermediate absorption liquid from a diluted absorption liquid, a cold regenerator for heating the intermediate absorption liquid generated and supplied by this hot regenerator with the coolant vapor generated by the hot regenerator for evaporating and separating the coolant furthermore, and obtaining a coolant vapor and a dense absorption liquid, a condenser for being supplied with a coolant liquid condensed by heating the intermediate absorption liquid in this cold regenerator and, at the same time, obtaining a coolant liquid by cooling the coolant vapor generated and supplied by this cold regenerator, an evaporator for evaporating the coolant by cooling a fluid flowing in a heat exchange tube on which the coolant liquid supplied from this condenser is spread, an absorber for absorbing the coolant vapor generated and supplied by this evaporator with the dense absorption liquid supplied by separating the coolant vapor from the cold regenerator for making a diluted absorption liquid and supplying the hot regenerator with same, a cold heat exchanger where the diluted absorption liquid and the dense absorption liquid flowing in and out this absorber exchange heat, and a hot heat exchanger where the intermediate absorption liquid and the diluted absorption liquid flowing in and out this hot regenerator exchange heat, wherein:

a first heat recovery system where an exhaust gas discharged from the combustion apparatus and the diluted absorption liquid having passed through the hot heat exchanger exchange heat, a second heat recovery system where the exhaust gas having passed through this first heat recovery system and the diluted absorption liquid, having passed through the low heat exchanger, before entering the hot heat exchanger branch into a plurality of passages and exchange heat, a valve provided at least in a passage of the plurality of passages, and a control means for controlling the opening/closing of this valve based on the exhaust gas temperature are provided.

BRIEF DESCRIPTION OF THE DRAWINGS

These and other objects and advantages of the present invention will become clear from the following description with reference to the accompanying drawings, wherein.

DETAILED DESCRIPTION OF THE PREFERRED EMBODIMENT

Now, embodiments of the present invention shall be described taking an example of absorption-refrigerator using water as coolant and aqueous solution of lithium bromide (LiBr) as absorption liquid.

[First Embodiment]

Figure 1:
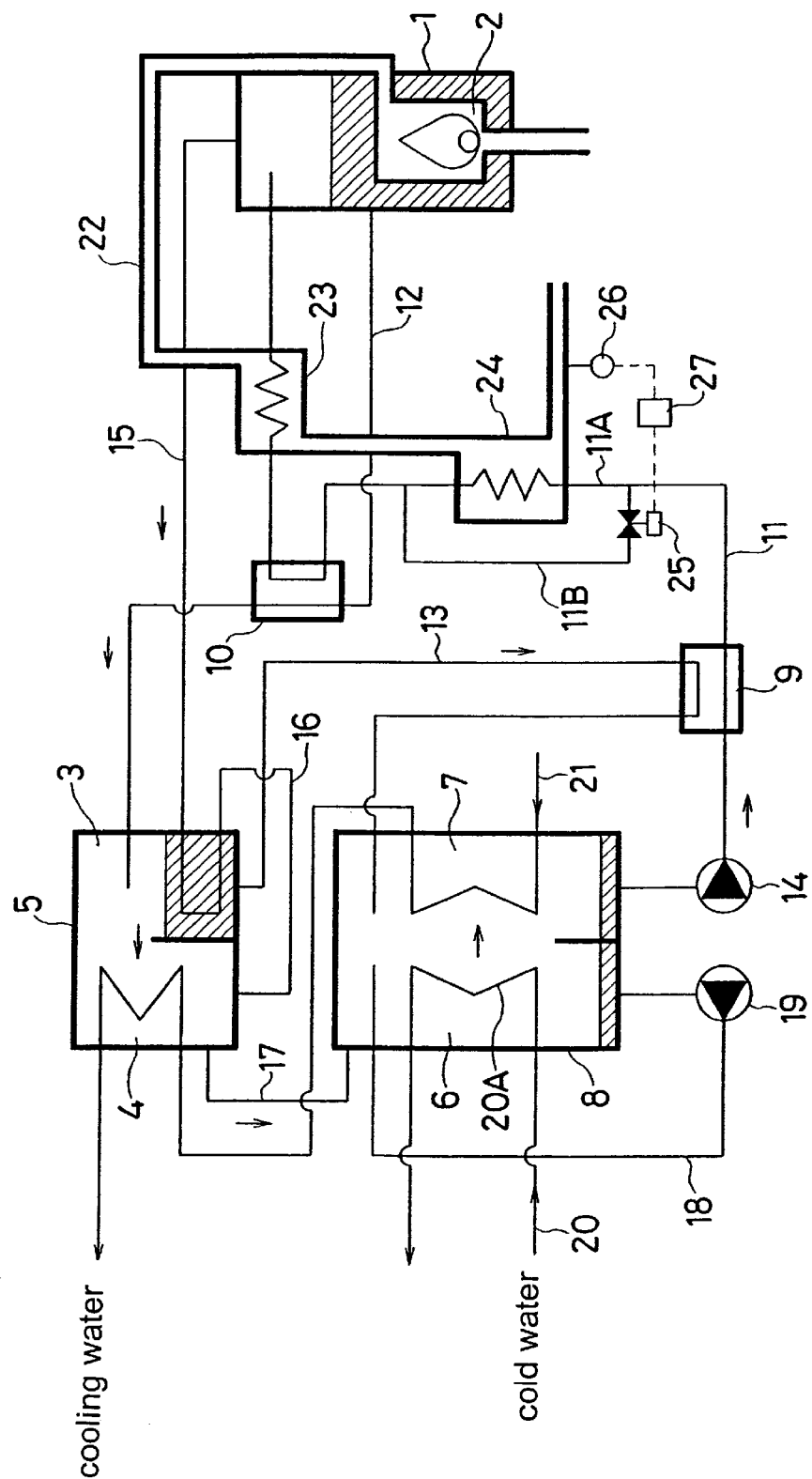
FIG. 1 is an illustrative drawing of a first embodiment of the present invention.

The first embodiment shall be described based on FIG. 1. In the drawing, 1 is a hot regenerator composed to heat the absorption liquid by the heating power of a gas burner 2 using for instance city gas as fuel for evaporating and separating the coolant, 3 a cold regenerator, 4 a condenser, 5 a hot shell containing the cold regenerator 3 and the condenser 4, 6 an evaporator, 7 an absorber, 8 a cold shell containing the evaporator 6 and the absorber 7, 9 a cold heat exchanger, 10 a hot heat exchanger, 11 to 13 are absorption liquid pipes, 14 an absorption liquid pump, 15 to 18 coolant pipes, 19 a coolant pump, 20 a cold water pipe, 21 a cooling water pipe, 22 an exhaust pipe for passing exhaust gas from the gas burner 2, 23 a first heat recovery system, 24 a second heat recovery system, 25 a flow control valve, 26 a temperature sensor for detecting the temperature of the exhaust gas flowing in the downstream portion of the exhaust pipe 22, and 27 a controller for controlling the opening of the flow control valve so that the temperature sensor 26 continues to detect a predetermined temperature, say 100° C.

The absorption liquid pipe 11 for transporting diluted absorption liquid from the absorber 7 to the hot regenerator 1 is provided with an absorption liquid pump 14 in the upstream portion, branches in a part between the cold heat exchanger 9 and the hot heat exchanger 10, one of branched absorption liquid pipe passes through the second heat recovery system 24, and a flow control valve 25 is provided in the middle of the other absorption liquid pipe bypassing the second heat recovery system 24. Hereinafter, the absorption liquid pipe passing through the second heat recovery system 24 shall be called absorption liquid heat exchange pipe 11A, while the other absorption liquid pipe bypassing the second heat recovery system 24 absorption liquid bypass pipe 11B.

In the absorption-refrigerator of the aforementioned composition, when the diluted absorption liquid is heated and boiled by the hot regenerator 1 with combustion of city gas by the gas burner 2, a coolant vapor evaporated and separated from the diluted absorption liquid and an intermediate absorption liquid condensed in absorption liquid by separating the coolant vapor can be obtained.

A hot coolant vapor produced in the hot regenerator 1 enters the cold regenerator 3 passing through the coolant pipe 15, heats the intermediate absorption liquid produced by the hot regenerator 1 and delivered to the cold regenerator 3 passing through the hot heat exchanger 10 by the absorption liquid pipe 12, radiates and condenses before entering the condenser 4.

On the other hand, the coolant evaporated and separated from intermediate absorption liquid by being heated with the cold regenerator 3 enters the condenser 4, condenses and liquefies through heat exchange with water flowing in the cooling water pipe 21, joins the coolant condensed and supplied from the coolant pipe 16, passes through the coolant pipe 17 before entering the evaporator 6.

The coolant liquid delivered to the evaporator 6 and accumulated in a coolant liquid accumulator is spread by a coolant pump 19 over a heat conduction pipe 20A connected to a cold water pipe 20 and evaporates through heat exchange with water supplied through the cold water pipe 20, and refrigerates the water flowing in the interior of the heat conduction pipe 20A.

The coolant evaporated in the evaporator 6 is delivered to the absorber 7, heated by the cold regenerator 3 for evaporating and separating the coolant, and absorbed by an absorption liquid further increased in the absorption liquid concentration, namely dense absorption liquid, supplied through the cold heat exchanger 9 by the absorption liquid pipe 13 and spread from above.

Then, absorption liquid reduced in the concentration by absorbing the coolant in the absorber 7, in short, the diluted absorption liquid is heated respectively by the cold heat exchanger 9•the second heat recovery system 24•hot heat exchanger 10•the first heat recovery system 23, by operating the absorption liquid pump 14 and delivered to the hot regenerator 1 from the absorption liquid pipe 11.

When the absorption-refrigerator is operated as mentioned above, cold water chilled by the heat of evaporation of the coolant in the heat exchange tube 20A disposed in the interior of the evaporator 6 can be supplied by circulation to a not shown air-conditioning load through the cold water pipe 20, allowing to perform a cooling down such as cooling.

In the absorption-refrigerator of the aforementioned composition, as the diluted absorption liquid extracted from the absorber 7 and transported to the hot regenerator 1 by the absorption liquid pump 14 is heated respectively in the cold heat exchanger 9•second heat recovery system 24•hot heat exchanger 10•first heat recovery system 23, the temperature of the diluted absorption liquid flowing in the hot regenerator 1 rises more than the one without first heat recovery system 23•second heat recovery system 24, allowing to cut the fuel consumption of the gas burner 2.

Furthermore, thanks to the control function of the controller 27, as the recuperation of heat held by the exhaust gas is accelerated by supplying the second heat recovery system 24 with much more diluted absorption liquid delivered from the absorber 7 to the hot regenerator 1 by reducing the opening of the flow control valve 25 when the temperature sensor 26 detects a temperature superior to 100° C., while the quantity of heat recuperated from the exhaust gas is limited by increasing the quantity of diluted absorption liquid bypassing the second heat recovery system 24 by increasing the opening of the flow control valve 25 when the temperature sensor 26 detects a temperature inferior to the predetermined temperature 100° C., the temperature of the exhaust gas evacuated from the exhaust pipe 22 is maintained to 100° C. superior to the dew-point temperature (the dew-point temperature of the combustion exhaust gas when city gas, namely natural gas is used as fuel is 60 to 70° C.), whereby, drain water will not be produced by condensation of water vapor contained in the exhaust gas, even during the starting at a low exhaust gas temperature or partial load operation, nor corrosion problems due to drain water be provoked.

[Second Embodiment]

Figure 2:
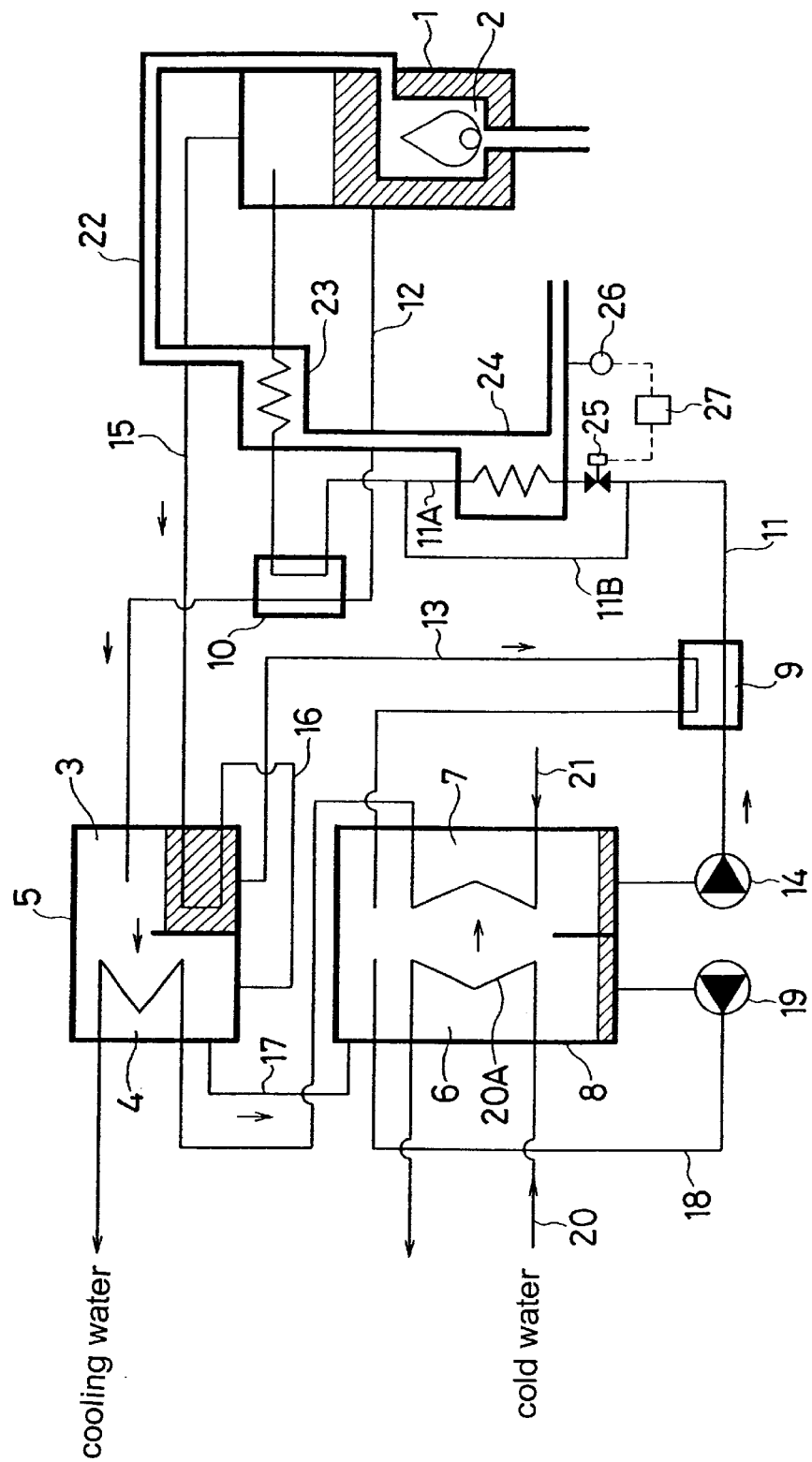
FIG. 2 is an illustrative drawing of a second embodiment of the present invention.

The second embodiment shall be described based on the FIG. 2. In the absorption-refrigerator of this second embodiment, the flow control valve 25 provided on an absorption liquid bypass pipe 11B in the absorption-refrigerator of the first embodiment shown in the FIG. 1 is provided at the inlet side of the second heat recovery system 24 of the absorption liquid heat exchange pipe 11A through the second heat recovery system 24, and the other piping composition is same as the absorption-refrigerator of the first embodiment.

And, in the absorption-refrigerator of this second embodiment, as the controller 27 accelerates recuperation of heat held by the exhaust gas is accelerated by increasing the opening of the flow control valve 25 installed on the absorption liquid heat exchange pipe 11A when the temperature sensor 26 detects a temperature superior to the predetermined temperature 100° C., and flows much more exhaust gas bypassing the second heat recovery system 24 by reducing the opening when the temperature sensor 26 detects a temperature inferior to the predetermined temperature 100° C., the temperature of the exhaust gas evacuated from the exhaust pipe 22 is maintained to 100° C. superior to the dew-point temperature, whereby, drain water will not be produced by condensation of water vapor contained in the exhaust gas, even during the starting at a low exhaust gas temperature or partial load operation, nor corrosion problems due to drain water be provoked.

It should be appreciated that, when an absorption liquid header is installed so that the diluted absorption liquid enters from the bottom in respect to the second heat recovery system 24 and exits upwards, even if blow holes are generated in the diluted absorption liquid heated by the exhaust gas in the second heat recovery system 24, the blow holes can be evacuated easily outside the header, by installing the flow control valve 25 at the diluted absorption liquid inlet side of the second heat recovery system 24, namely in a underside portion of the absorption liquid heat exchange pipe 11A.

[Third Embodiment]

Figure 3:
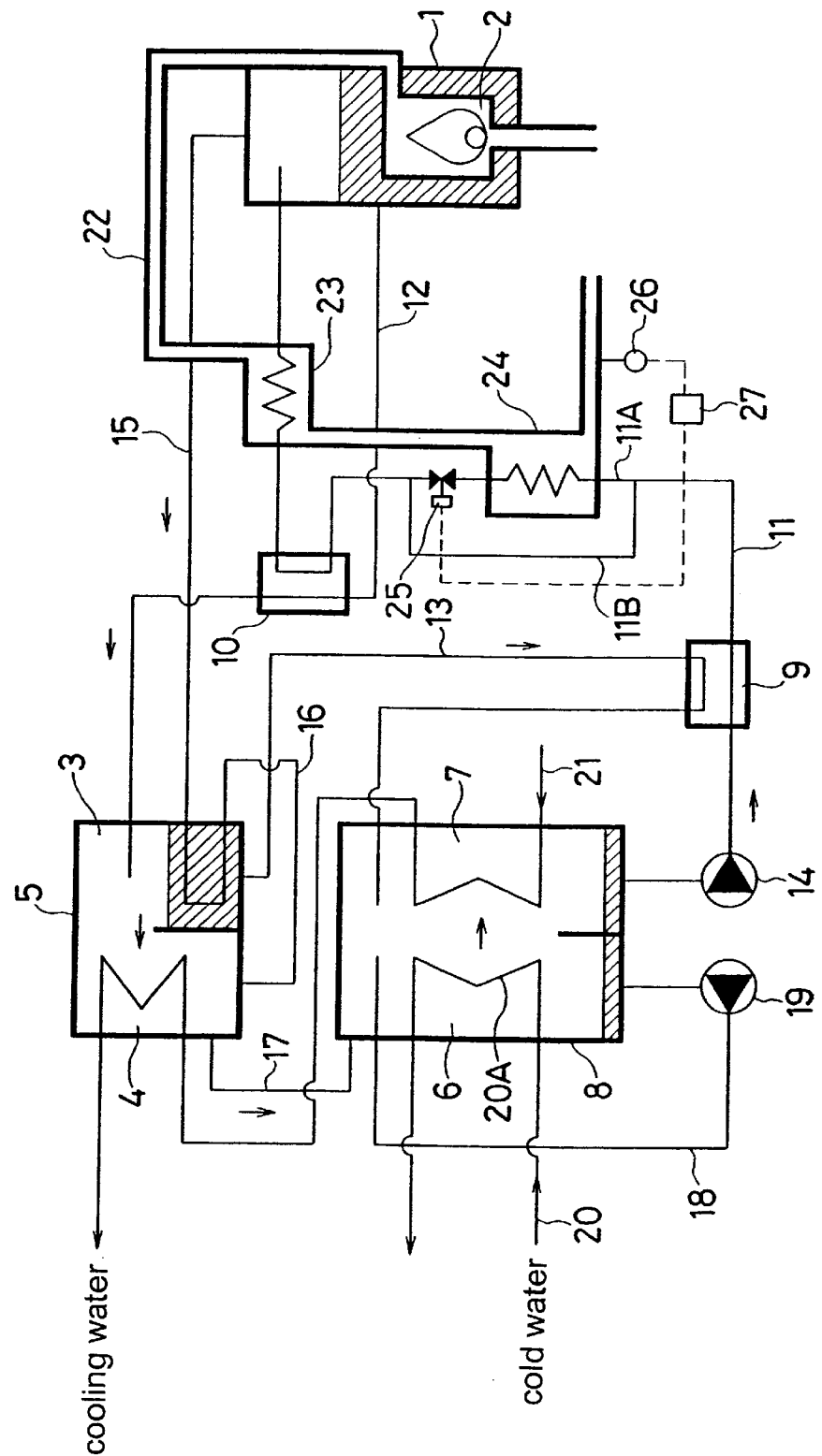
FIG. 3 is an illustrative drawing of a third embodiment of the present invention.

The third embodiment shall be described based on FIG. 3. In the absorption-refrigerator of this third embodiment, the flow control valve 25 provided on at the inlet side of the second heat recovery system 24 of the absorption liquid heat exchange pipe 11A in the absorption-refrigerator of the second embodiment shown in the FIG. 2 is provided at the outlet side of the second heat recovery system 24 and the other piping composition is same as the absorption-refrigerator of the aforementioned second embodiment.

And, in the absorption-refrigerator of this third embodiment also, as the controller 27 accelerates recuperation of heat held by the exhaust gas is accelerated by increasing the opening of the flow control valve 25 installed on the absorption liquid heat exchange pipe 11A when the temperature sensor 26 detects a temperature superior to 100° C., and flows much more exhaust gas bypassing the second heat recovery system 24 by reducing the opening when the temperature sensor 26 detects a temperature inferior to the predetermined temperature 100° C., the temperature of the exhaust gas evacuated from the exhaust pipe 22 is maintained to 100° C. superior to the dew-point temperature, whereby, drain water will not be produced by condensation of water vapor contained in the exhaust gas, even during the starting at a low exhaust gas temperature or partial load operation, nor corrosion problems due to drain water be provoked.

It should be appreciated that, when the flow control valve 25 is installed at the outlet side of the second heat recovery system 24 of one absorption liquid heat exchange pipe 11A, even if the diluted absorption liquid is heated to a temperature that likely generates blow holes in the diluted absorption liquid in the second heat recovery system 24 due to a high temperature of the exhaust gas, the blow holes are generated hardly in this portion where the pressure of the absorption liquid pump 14 is applied.

[Fourth Embodiment]

Figure 4:
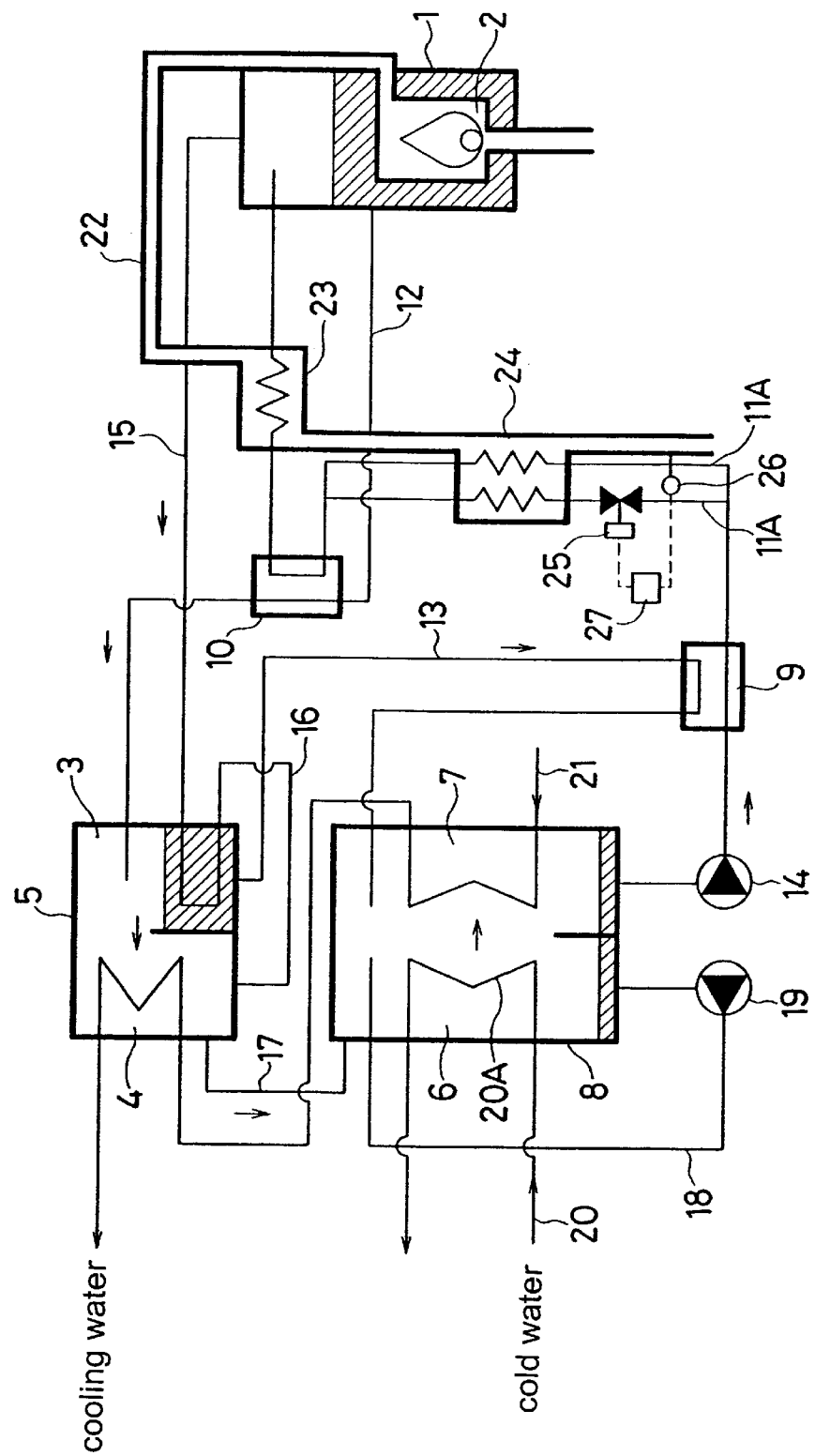
FIG. 4 is an illustrative drawing of a fourth embodiment of the present invention.

The fourth embodiment shall be described based on the FIG. 4. In the absorption-refrigerator of this fourth embodiment, two absorption liquid heat exchange pipes 11A passing through the second heat recovery system 24 are provided in place of absorption liquid bypass pipe 11B provided in the absorption-refrigerator of the first embodiment shown in the FIG. 1 and a flow control valve 25 is installed at the inlet side of the second heat recovery system 24 of one absorption liquid heat exchange pipe 11A, and the other piping composition is same as the absorption-refrigerator of the first embodiment.

And, in the absorption-refrigerator of this fourth embodiment, as the controller 27 accelerates recuperation of heat held by the exhaust gas is accelerated by enlarging the apparent heating surface area by increasing the opening of the flow control valve 25 installed on one of the absorption liquid heat exchange pipes 11A when the temperature sensor 26 detects a temperature superior to the predetermined temperature 100° C., and reduces the apparent heating surface area by reducing the opening when the temperature sensor 26 detects a temperature inferior to the predetermined 100° C., in this case also, the temperature of the exhaust gas evacuated from the exhaust pipe 22 is maintained to 100° C. superior to the dew-point temperature, whereby, drain water will not be produced by condensation of water vapor contained in the exhaust gas, even during the starting at a low exhaust gas temperature or partial load operation, nor corrosion problems due to drain water be provoked.

When an absorption header is installed so that the diluted absorption liquid enters from the bottom in respect to the second heat recovery system 24 and exits upwards, even if blow holes are generated in the diluted absorption liquid heated by the exhaust gas in the second heat recovery system 24, the blow holes can be evacuated easily outside the header, by installing the flow control valve 25 at the diluted absorption liquid inlet side of the second heat recovery system 24, namely in a underside portion of the absorption liquid heat exchange pipe 11A.

[Fifth Embodiment]

Figure 5:
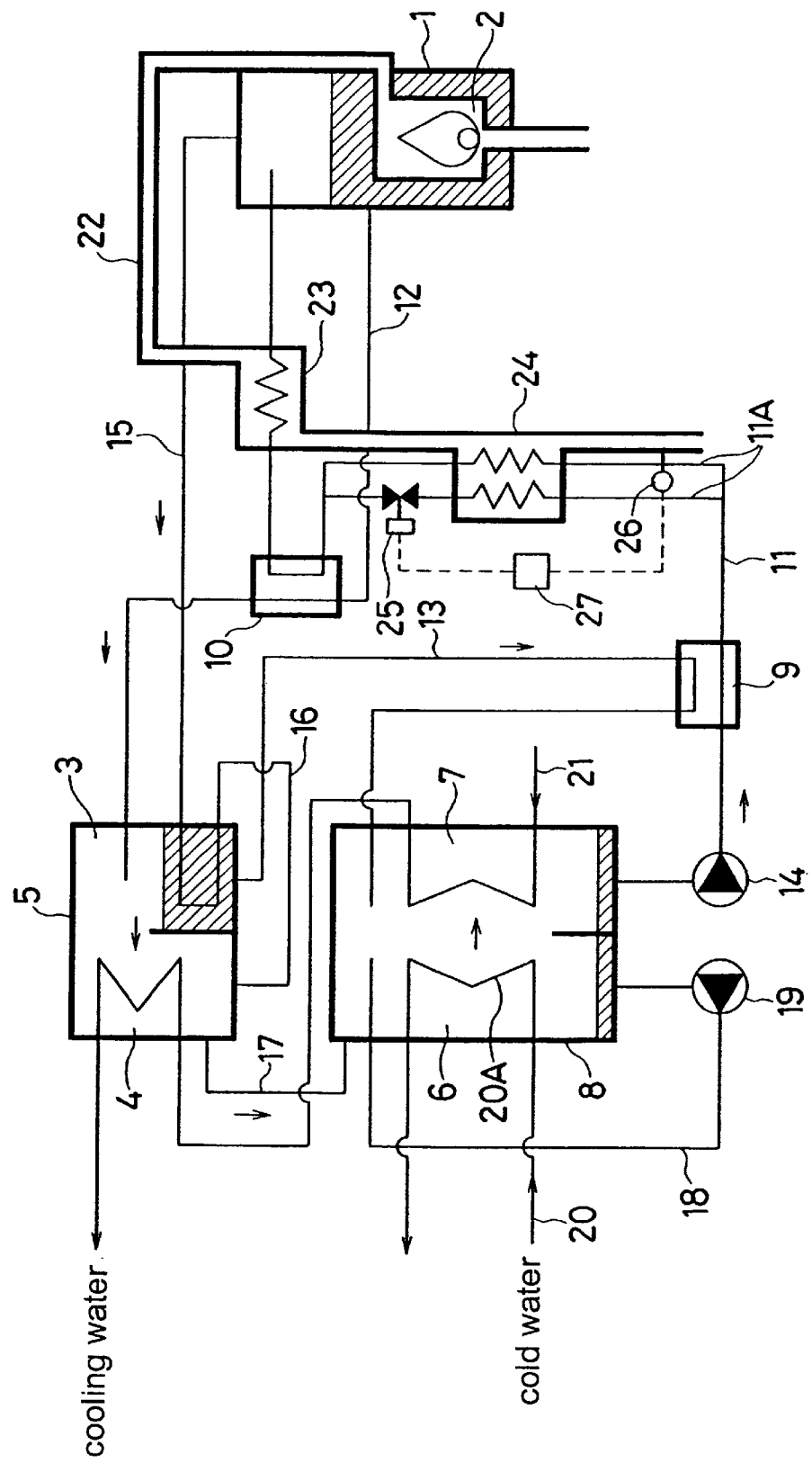
FIG. 5 is an illustrative drawing of a fifth embodiment of the present invention.

The fifth embodiment shall be described based on the FIG. 5. In the absorption-refrigerator of this fifth embodiment, the flow control valve 25 installed at the inlet side of the second heat recovery system 24 of one absorption liquid heat exchange pipe 11A provided in the absorption-refrigerator of the fourth embodiment shown in FIG. 4 is now disposed at the outlet side of the second heat recovery system 24, and the other piping composition is same as the absorption-refrigerator of the fourth embodiment.

And, in the absorption-refrigerator of this fifth embodiment also, as the controller 27 accelerates recuperation of heat held by the exhaust gas is accelerated by enlarging the apparent heating surface area by increasing the opening of the flow control valve 25 installed on one of the absorption liquid heat exchange pipe 11A when the temperature sensor 26 detects a temperature superior to 100° C., and reduces the apparent heating surface area by reducing the opening when the temperature sensor 26 detects a temperature inferior to the predetermined temperature 100° C., in this case also, the temperature of the exhaust gas evacuated from the exhaust pipe 22 is maintained to 100° C. superior to the dew-point temperature, whereby, drain water will not be produced by condensation of water vapor contained in the exhaust gas, even during starting at a low exhaust gas temperature or partial load operation, nor corrosion problems due to drain water be provoked.

When the flow control valve 25 is installed at the outlet side of the second heat recovery system 24 of one absorption liquid heat exchange pipe 11A, even if the diluted absorption liquid is heated to a temperature that likely generates blow holes in the diluted absorption liquid in the second heat recovery system 24 due to a high temperature of the exhaust gas, the blow holes are generated hardly in this portion where the pressure of the absorption liquid pump 14 is applied.

[Sixth Embodiment]

Figure 6:
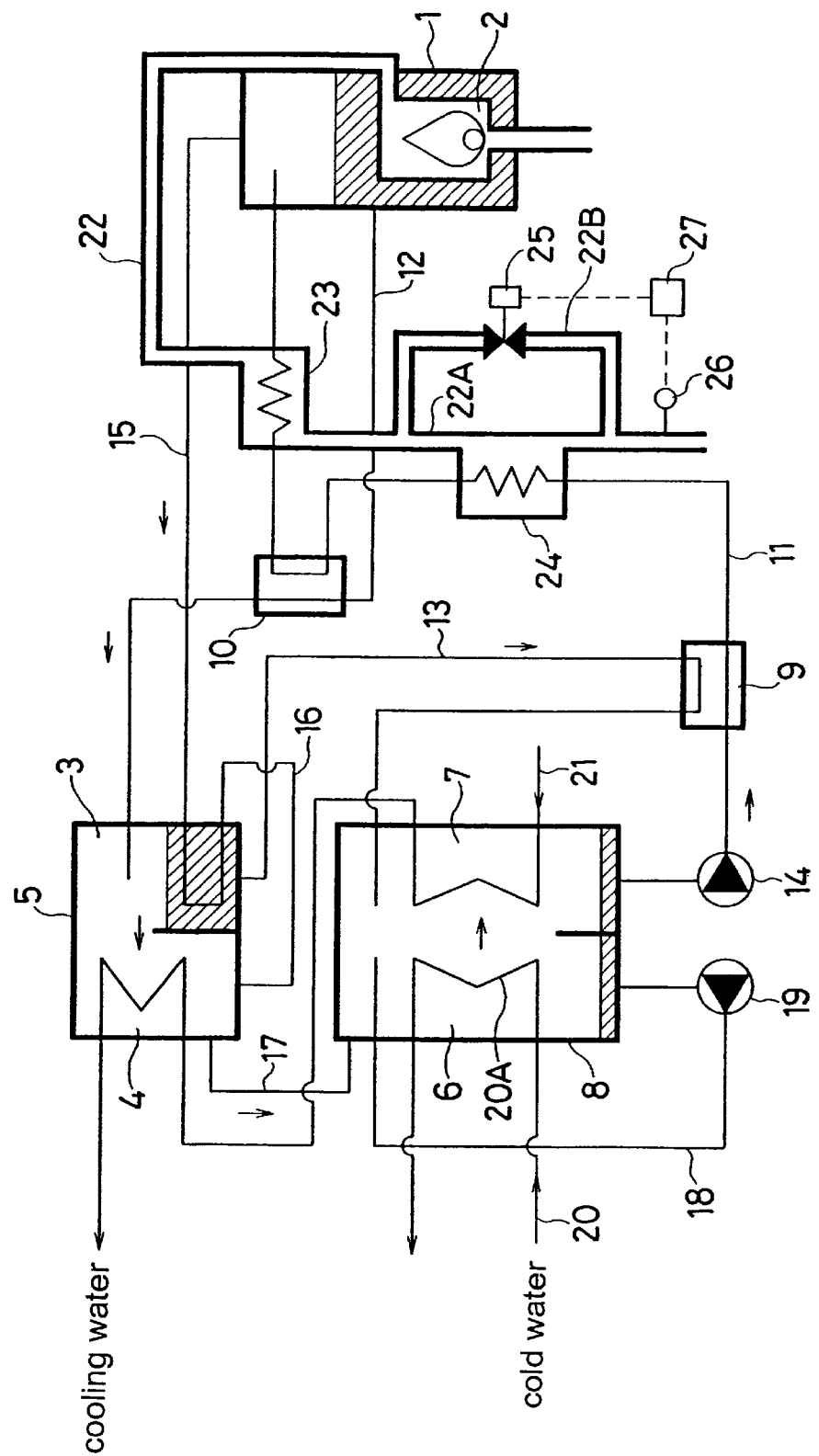
FIG. 6 is an illustrative drawing of a sixth embodiment of the present invention.

The sixth embodiment shall be described based on FIG. 6. In the absorption-refrigerator of this sixth embodiment, an exhaust bypass pipe 22B bypassing the second heat recovery system 24 is provided in place of absorption liquid bypass pipe 11B provided in the absorption-refrigerator of the first embodiment shown in FIG. 1 and a flow control valve 25 is installed therein, and the other piping composition is same as the absorption-refrigerator of the first embodiment.

Furthermore, in the absorption-refrigerator of this sixth embodiment, since the controller 27 accelerates recuperation of heat held in the exhaust gas by supplying much exhaust gas in the second heat recovery system 24 by reducing the opening of the flow control valve 25 installed on the exhaust bypass pipe 22B when the temperature sensor 26 detects a temperature superior to the predetermined temperature 100° C., and controls recuperation of heat from the exhaust gas flowing much more exhaust gas bypassing the second heat recovery system 24 by enlarging the opening of the valve when the temperature sensor 26 detects a temperature inferior to 100° C., the temperature of the exhaust gas evacuated from the exhaust pipe 22 is maintained to a temperature 100° C. superior to the dew-point temperature, whereby, drain water will not be produced by condensation of water vapor contained in the exhaust gas, even during the starting or partial load operation, at a low exhaust gas temperature nor corrosion problems due to drain water be provoked.

[Seventh Embodiment]

Figure 7:
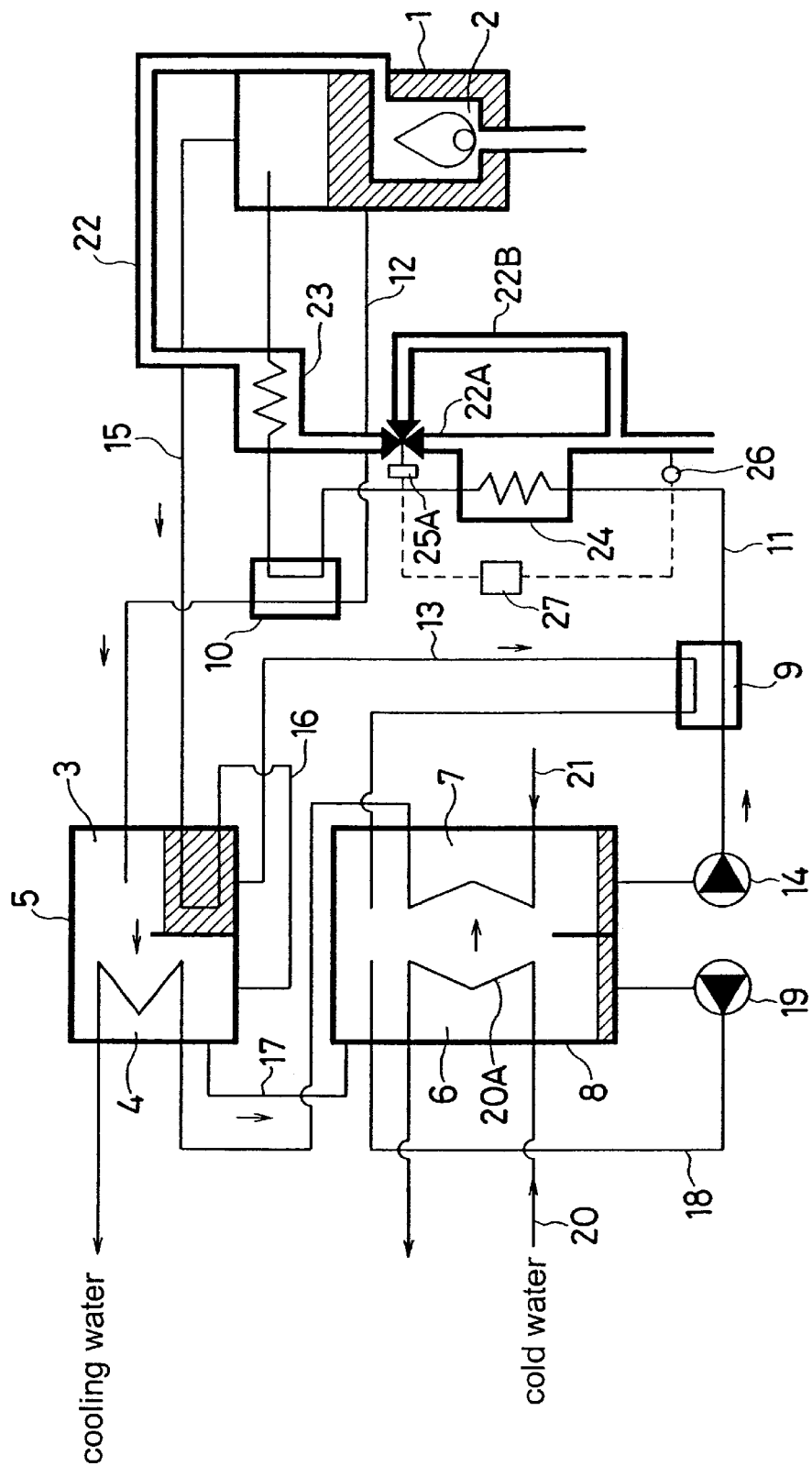
FIG. 7 is an illustrative drawing of a seventh embodiment of the present invention.
Figure 8:
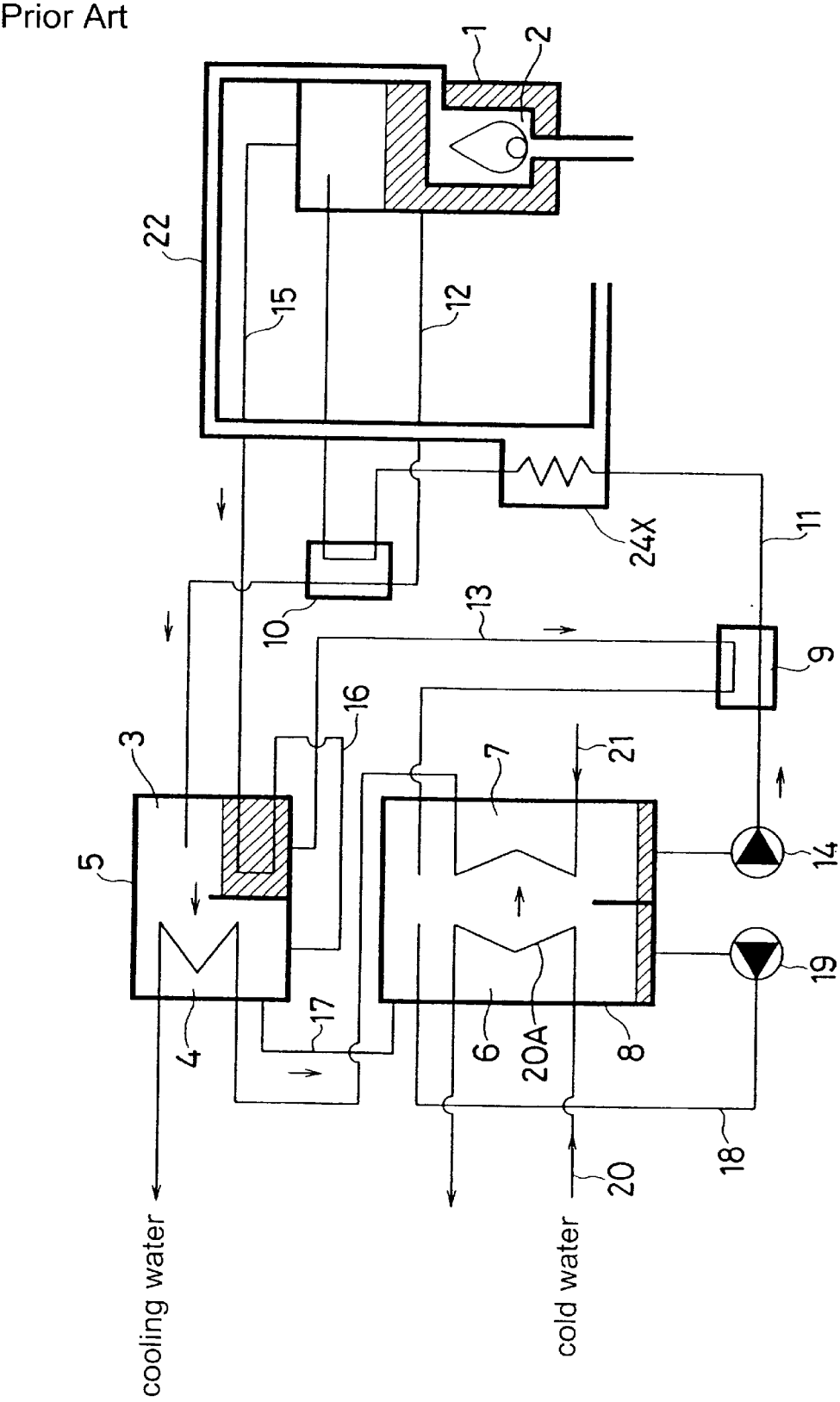
FIG. 8 is an illustrative drawing of a prior art.

The seventh embodiment shall be described based on FIG. 7. In the absorption-refrigerator of this seventh embodiment, the flow control valve 25 installed on the exhaust bypass pipe 22B provided in the absorption-refrigerator of the sixth embodiment shown in FIG. 6 is now replace with a three-way changeover damper 25A installed at the branch of the exhaust heat exchange pipe 22A passing through the second heat recovery system 24 and the exhaust bypass pipe 22B bypassing the second heat recovery system 24, and the other piping composition is same as the absorption-refrigerator of the fourth embodiment.

Furthermore, the absorption-refrigerator of this seventh embodiment, since the controller 27 accelerates recuperation of heat held in the exhaust gas by supplying much exhaust gas in the second heat recovery system 24 by controlling the three-way changeover damper 25A so that much more exhaust gas flows to the side of the exhaust heat exchange pipe 22A when the temperature sensor 26 detects a temperature superior to 100° C., and that much more exhaust bypasses the second heat recovery system 24 when the temperature sensor 26 detects a temperature inferior to the predetermined temperature 100° C., in this case also, the temperature of the exhaust gas evacuated from the exhaust pipe 22 is maintained to a temperature 100° C. superior to the dew-point temperature, whereby, drain water will neither be produced by condensation of water vapor contained in the exhaust gas, even during the starting at a low exhaust gas temperature or partial load operation, nor corrosion problems due to drain water be provoked. It should be appreciated that the three-way changeover damper 25A may also be installed at the junction of the exhaust heat exchange pipe 22A and exhaust bypass pipe 22B.

The invention is not limited to the aforementioned embodiment, but can be modified in various ways without departing from the subject matter defined in the attached claims.

For example, a cheap on-off valve may be installed in place of the flow control valve 25, and the opening/closing thereof may be controlled by the controller 27 so that the exhaust gas temperature detected by the temperature sensor 26 is not inferior to a predetermined temperature.

Also, the absorption-refrigerator may be composed exclusively for the cooling down such as the aforementioned room cooling, or devised to perform heating operation such as room heating by connecting the piping so that the cold shell 8 can be supplied directly with coolant vapor heated and generated in the hot regenerator 1 and absorption liquid obtained by evaporation and separating the coolant vapor, heating the diluted absorption liquid by the gas burner 2 without delivering cooling water to the cooling water pipe 21, and supplying a load 2 by circulation with a water heated for instance to the order of 55° C. in the heat exchange tube 20A of the evaporator 6 through a cold water pipe 20 (preferably called hot water pipe in case of circulating hot water).

Besides, the fluid refrigerated or like in the evaporator 6 and supplied to an air-conditioning load may be the water or others to be supplied without phase change as in the aforementioned embodiment, or fleon and the like to be supplied with phase change, so that a heat transport using latent heat is enabled.

EFFECTS OF THE INVENTION

As mentioned hereinabove, according to the present invention, it is possible to recuperate effectively heat held by the exhaust gas. Moreover, drain water will neither be produced by condensation of water vapor contained in the exhaust gas, nor corrosion problems due to drain water be provoked, because the abnormal fall of exhaust gas temperature can be prevented by limiting heat recuperation during the starting or partial load operation lowering the exhaust gas temperature. While the presently preferred embodiment of the present invention has been shown and described, it will be understood that the present invention is not limited thereto, and that various changes and modification may be made by those skilled in the art without departing from the scope of the invention as set forth in the appended claims.

What is claimed is:

1. An absorption-refrigerator comprising a hot regenerator for evaporating and separating a coolant by heating and boiling by a combustion apparatus and obtaining a coolant vapor and an intermediate absorption liquid from a diluted absorption liquid, a cold regenerator for heating the intermediate absorption liquid generated and supplied by said hot regenerator with the coolant vapor generated by the hot regenerator for evaporating and separating the coolant furthermore, and obtaining a coolant vapor and a dense absorption liquid from the obtained intermediate absorption liquid, a condenser for being supplied with a coolant liquid condensed by heating the intermediate absorption liquid in said cold regenerator and, at the same time, obtaining a coolant liquid by cooling the coolant vapor generated and supplied by said cold regenerator, an evaporator for evaporating the coolant by cooling a fluid flowing in a heat exchange tube on which the coolant liquid supplied from said condenser is spread, an absorber for making a diluted absorption liquid by absorbing the coolant vapor generated and supplied through said evaporator in the dense absorption liquid supplied by separating the coolant vapor from the cold regenerator and supplying the hot regeneration with the same, a cold heat exchanger where the diluted absorption liquid and the dense absorption liquid flowing in and out said absorber exchange heat, and a hot heat exchanger where the intermediate absorption liquid and the diluted absorption liquid flowing in and out said hot regenerator, wherein:

said absorption-refrigerator comprised a first heat recovery system where exhaust gas discharged from the combustion apparatus and the diluted absorption liquid having passed through the hot heat exchanger exchange heat, a second heat recovery system where the exhaust gas having passed through said first heat recovery system and the diluted absorption liquid, having passed through the low heat exchanger before entering the hot heat exchanger exchange heat, an exhaust pipe or absorption liquid pipe bypassing said second heat recovery system, a valve provided in the exhaust pipe or absorption liquid pipe bypassing the second heat recovery system, and a control means for controlling the opening/closing of said valve based on the exhaust gas temperature.

2. An absorption-refrigerator comprising a hot regenerator for evaporating and separating a coolant by heating and boiling by a combustion apparatus and obtaining a coolant vapor and an intermediate absorption liquid from a diluted absorption liquid, a cold regenerator for heating the intermediate absorption liquid generated and supplied by said hot regenerator with the coolant vapor generated by the hot regenerator for evaporating and separating the coolant furthermore, and obtaining a coolant vapor and a dense absorption liquid from an intermediate absorption liquid, a condenser for being supplied with a coolant liquid condensed by heating the intermediate absorption liquid in said cold regenerator and, at the same time, obtaining a coolant liquid by cooling the coolant vapor generated and supplied by said cold regenerator, an evaporator for evaporating the coolant by cooling a fluid flowing in a heat exchange tube on which the coolant liquid supplied from said condenser is spread, an absorber for making a diluted absorption liquid by absorbing the coolant vapor generated and supplied through said evaporator in the dense absorption liquid supplied by separating the coolant vapor from the cold regenerator and supplying the hot regeneration with the same, a cold heat exchanger where the diluted absorption liquid and the dense absorption liquid flowing in and out said absorber exchange heat, and a hot heat exchanger where the intermediate absorption liquid and the diluted absorption liquid flowing in and out said hot regenerator, wherein:

a first heat recovery system where an exhaust gas discharged from the combustion apparatus and the diluted absorption liquid having passed through the hot heat exchanger exchange heat, a second heat recovery system where the exhaust gas having passed through said first heat recovery system and the diluted absorption liquid, having passed through the low heat exchanger, before entering the hot heat exchanger branch into a plurality of passages and exchange heat, a valve provided in at least a passage of the plurality of passages, and a control means for controlling the opening/closing of said valve based on the exhaust gas temperature.

* * * * *